Patented June 3, 1947

2,421,553

UNITED STATES PATENT OFFICE 2,421,553

AZO DYES FROM 2,6 DIHALO 4 NITRANILINE

Friedrich Felix, Basel, and Rudolf von Capeller, Riehen, Switzerland, assignors to Society of Chemical Industry in Basle, Basel, Switzerland, a Swiss firm No Drawing. Application February 26, 1945, Serial No. 579,902. In Switzerland March 15, 1944

6 Claims. (Cl. 260—169)

The manufacture of triazo-dyestuffs dyeing grey tints has been described in various specifications. These are generally dyestuffs consisting of a starting component of the benzene or naphthalene series, a middle component such as α-naphthylamine and 6- or 7-sulfonic acids thereof, a second middle component of this group and a final component of the naphthalene series, for example an aminonaphthalene derivative, such as an aminohydroxynaphthalene sulfonic acid. These dyestuffs yield dyeings which are characterized by a remarkable fastness to light. All these dyeings, however, have the serious disadvantage of being sensitive when boiled in alkaline media. This property renders their application difficult for many purposes where prolonged boiling is necessary, for example when dyeing materials which can be dyed through only difficultly.

According to the present invention polyazo-dyestuffs of the aforementioned constitution are obtained by coupling diazotized disazo-dyestuffs of the general formula

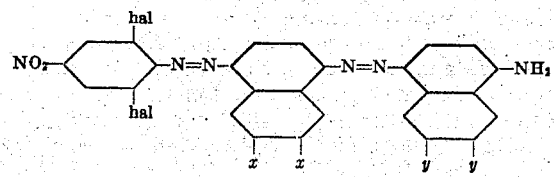

wherein hal stands for one of the halogens chlorine and bromine, one $x$ and one $y$ each stand for a hydrogen atom and one $x$ and one $y$ each stand for a hydrogen atom or a sulfonic acid group, with a sulfonated aminonaphthalene derivative. These polyazo-dyestuffs yield grey dyeings which are characterized by a surprising fastness to boiling. They correspond to the general formula

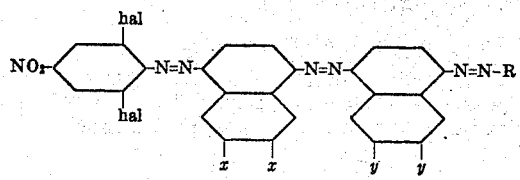

wherein hal stands for one of the halogens chlorine and bromine, one $x$ and one $y$ each stand for a hydrogen atom and one $x$ and one $y$ each stand for a hydrogen atom or a sulfonic acid group, and R stands for a sulfonated aminonaphthalene component. As sulfonated aminonaphthalene derivatives there can be used compounds such as e. g., 1-phenylaminonaphthalene-8-sulfonic acid, 1-(4'-methyl)-phenylaminonaphthalene-8-sulfonic acid, 2-aminonaphthalene-6-sulfonic acid, sulfonic acids of amino-hydroxynaphthalenes and N-derivatives thereof, especially 2-amino-5-hydroxynaphthalene-7-sulfonic acid and N-substitution products thereof, such as 2-amino-5-hydroxynaphthalene-7-sulfonic acid itself, 2-phenylamino-5-hydroxynaphthalene-7-sulfonic acid, 2-(4'-methoxy)-phenylamino - 5 - hydroxynaphthalene-7-sulfonic acid, 2-(4'-hydroxy)-phenylamino-5-hydroxynaphthalene-7-sulfonic acid-3'-carboxylic acid, 2-benzoylamino-5-hydroxynaphthalene-7-sulfonic acid, the secondary condensation product of 1 mol. of cyanuric chloride, 1 mol. of 2-amino-5-hydroxynaphthalene - 7 - sulfonic acid and 1 mol. of 1-aminobenzene-3-sulfonic acid, the ternary condensation product from 1 mol. of cyanuric chloride, 1 mol. of 2-amino-5-hydroxynaphthalene-7-sulfonic acid, 1 mol. of 1-aminobenzene-3-sulfonic acid and 1 mol. of aniline, 2-amino-8-hydroxynaphthalene-6-sulfonic acid, 2-acetylamino - 8 - hydroxynaphthalene-6-sulfonic acid, 2-(4'-methyl- or 4'-methoxy)-phenylamino-8-hydroxynaphthalene - 6-sulfonic acid, 2-amino-8-hydroxynaphthalene-3:6-disulfonic acid, 2-amino-5-hydroxynaphthalene-1:7-disulfonic acid, 2-benzoylamino-8-hydroxy-naphthalene-6-sulfonic acid, 1-amino-5-hydroxynaphthalene-7-sulfonic acid, 1-phenylamino-5-hydroxynaphthalene-7-sulfonic acid, the ternary condensation product of 1 mol. of cyanuric chloride, 1 mol. of 1-amino-8-hydroxynaphthalene-3:6-disulfonic acid and 2 mols. of aniline, and the like.

Finally, there can also be used amino-hydroxynaphthalene derivatives which couple twice in an alkaline medium, for example the urea of 2-amino-5-hydroxynaphthalene-7-sulfonic acid, or the 2:2'-dinaphthylamine-5:5'-dihydroxy-7:7'-disulfonic acid.

In the above indicated amino-hydroxynaphthalene derivatives, provided that they are capable of coupling in an acid or alkaline medium and thus lead to different dyestuff groups (whether coupling is determined by the amino group or by the hydroxy group), the final component can be used both in an acid and in an alkaline medium.

The following examples illustrate the invention, but are not to be regarded as limiting it in any way, the parts being by weight:

Example 1

20.7 parts of 1-amino-2:6-dichloro-4-nitrobenzene are diazotized in usual manner with nitrosylsulfuric acid, poured onto ice and mixed with 30 parts of magnesium oxide. To this is added a neutral solution of 22.3 parts of 1-aminonaphthalene-7-sulfonic acid. The formation of dyestuff is accelerated advantageously by addition of sodium acetate, the precipitated dyestuff is suction-filtered, suspended in water, made alkaline with sodium carbonate and, if necessary, salted out with sodium chloride and again suction-filtered. This monoazo-dyestuff is further diazotized in usual manner and coupled with 1-amino-naphthalene-7-sulfonic acid in an acetic acid medium. The disazo-dyestuff thus obtained is further diazotized and coupled with 2-amino-5-hydroxynaphthalene-7-sulfonic acid in a medium alkaline with sodium carbonate. It is then phenylamino - naphthalene-8-hydroxy-7-sulfonic acid and the like. When using 1-phenylamino-8-sulfonic acid instead of 2-amino-5-hydroxynaphthalene-7-sulfonic acid it is advantageous to produce the dyestuff in an acetic acid medium and not in a medium alkaline with sodium carbonate. Instead of the 2-amino-5-hydroxynaphthalene-7-sulfonic acid there is used with good result a condensation product of this acid, e. g. the ternary condensation product of 1 mol. of cyanuric chloride with 1 mol. of 2-amino-5-hydroxynaphthalene-7-sulfonic acid, 1 mol. of 1-aminobenzene-3-sulfonic acid and 1 mol. of aniline. The dyestuff so obtained has the formula

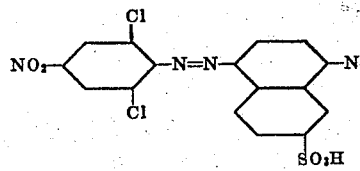

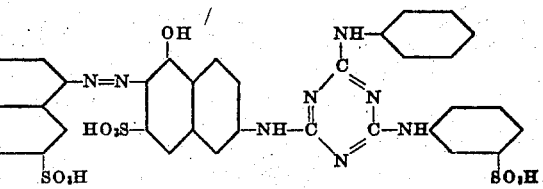

filtered, washed with a solution of sodium chloride and dried. The dyestuff forms a dark grey powder dissolving in water to give a blue-grey coloration. It dyes cotton from an aqueous solution grey tints of good fastness to washing and to light. The dyestuff corresponds to the formula

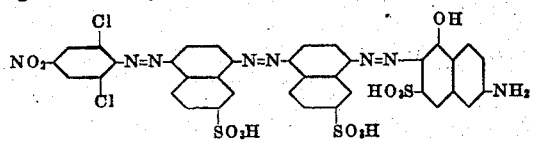

When replacing the 1-aminonaphthalene-7-sulfonic acid by 1-aminonaphthalene-6-sulfonic acid there is obtained a dyestuff of the general formula

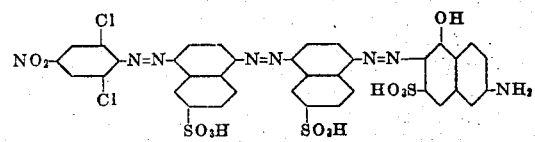

which has very similar properties. The commercial mixture consisting of 1-aminonaphthalene-6-sulfonic acid and 1-aminonaphthalene-7-sulfonic acid can therefore also be used.

In all instances very similar products are obtained if the 1-amino-2:6-dichloro-4-nitrobenzene is replaced by the corresponding quantity of 1-amino-2:6-dibromo or 1-amino-2-chloro-6-bromo-4-nitrobenzene.

These dyestuffs are worked up in usual manner and dye cotton grey tints of good fastness to boiling and to light.

*Example 2*

52.4 parts of the secondary condensation product of 1 mol. of cyanuric chloride with 1 mol. of 1:8 - aminohydroxynaphthalene - 3:6 - disulfonic acid and 1 mol. of aniline are dissolved in 500 parts of water and 20 parts of sodium carbonate. Into this solution which has been cooled with ice there is introduced the diazo compound obtained from 67.5 parts of the disazo-dyestuff which is itself obtained by coupling diazotized 1-amino-2:6-dichloro-4-nitrobenzene and 1-aminonaphthalene-7-sulfonic acid, diazotizing the monoazo-dyestuff and coupling with a second molecule of 1-aminonaphthalene-7-sulfonic acid. The dyestuff thus formed is salted out with sodium chloride. It corresponds to the formula

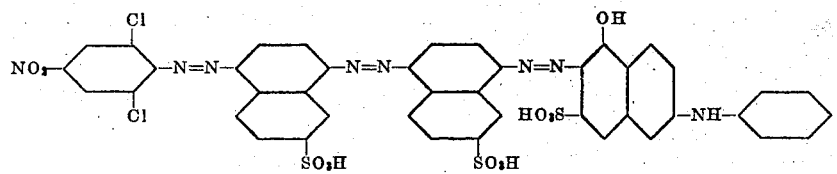

By working in analogous manner and using 2-phenyl-amino-5 - hydroxynaphthalene-7-sulfonic acid instead of 2-amino-5-hydroxynaphthalene sulfonic acid there is obtained a dyestuff yielding dyeings of even better fastness to light. This corresponds to the formula

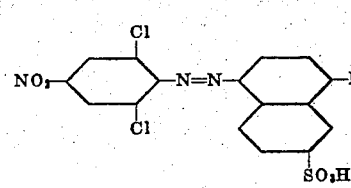

Instead of 2-amino-5-hydroxynaphthalene-7-sulfonic acid there can further be used 1-amino-5-hydroxynaphthalene-7-sulfonic acid, 2-amino-8-hydroxynaphthalene-6-sulfonic acid, 2- and dyes cotton grey tints.

*Example 3*

A dye-bath is prepared with 0.5 per cent. of the dyestuff of Example 1 from 1-amino-2:6-dichloro-4-nitrobenzene, 1 mol. of 1-aminonaphthalene-7-sulfonic acid, 1 mol. of 1-aminonaphthalene-7-sulfonic acid and 1 mol. of 2-phenyl-amino-5-hydroxynaphthalene-7-sulfonic acid and 2 per cent. of sodium carbonate. The cotton is introduced at 60° C., the bath is heated to the boil, 30 per cent. of sodium sulfate are added after ¼ hour and boiling is continued for a further ½ hour. The cotton is dyed grey tints. The dyeing remains unchanged on prolonged boiling.

*Example 4*

A dye-bath is prepared with 0.5 per cent. of the dyestuff of Example 1 from 1-amino-2:6-dichloro-4-nitrobenzene, 1 mol. of the commercial mixture from 1-aminonaphthalene-7-sulfonic acid and 1-aminonaphthalene-6-sulfonic acid, 1 mol. of the same commercial mixture and 1 mol. of 2-phenylamino-5-hydroxynaphthalene-7-sulfonic acid and 2 per cent. of sodium carbonate. Viscose rayon is introduced at 60° C., the bath is heated to 90-95° C., 30 per cent. of sodium sulfate are added and boiling is continued for a further ½ hour. The viscose rayon is dyed grey tints. The dyeing remains unchanged on prolonged boiling.

What we claim is:

1. A dyestuff corresponding in the free form to the general formula

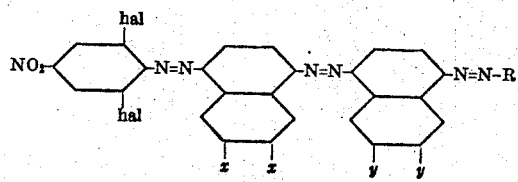

wherein hal stands for one of the halogens chlorine and bromine, one $x$ and one $y$ each stand for a hydrogen atom and one $x$ and one $y$ each stand for a member of the group consisting of hydrogen and $SO_3H$, and R stands for a sulfonated aminonaphthalene compound.

2. A dyestuff corresponding in the free form to the general formula

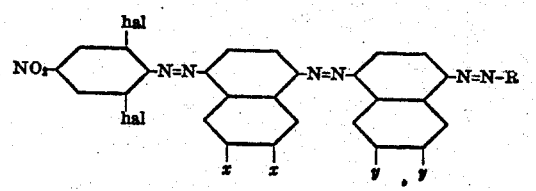

wherein hal stands for one of the halogens chlorine and bromine, one $x$ and one $y$ each stand for a hydrogen atom and one $x$ and one $y$ each stand for a member of the group consisting of hydrogen and $SO_3H$, and R stands for a sulfonated hydroxyaminonaphthalene compound.

3. A dyestuff corresponding in the free form to the general formula

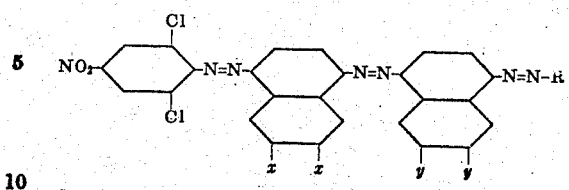

wherein one $x$ and one $y$ each stand for a hydrogen atom and one $x$ and one $y$ each stand for a member of the group consisting of hydrogen and $SO_3H$, and R stands for a sulfonated aminonaphthalene compound.

4. A dyestuff corresponding in the free form to the general formula

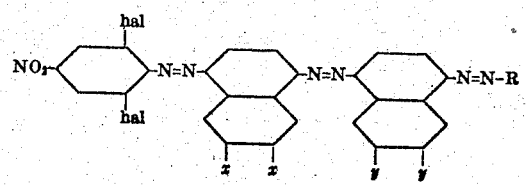

wherein hal stands for one of the halogens chlorine and bromine, one $x$ and one $y$ each stand for a hydrogen atom and one $x$ and one $y$ each stand for a member of the group consisting of hydrogen and $SO_3H$, and R stands for a N-phenylated 5-hydroxy-2-aminonaphthalene-7-sulfonic acid compound.

5. The dyestuff of the formula

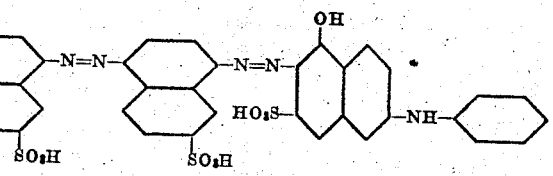

6. The dyestuff of the formula

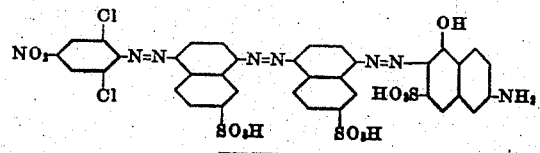

FRIEDRICH FELIX.
RUDOLF VON CAPELLER.

REFERENCES CITED

The following references are of record in the file of this patent:

UNITED STATES PATENTS

| Number | Name | Date |
|---|---|---|
| 1,270,290 | Hagemann | June 25, 1918 |

FOREIGN PATENTS

| Number | Country | Date |
|---|---|---|
| 852,042 | France | Oct. 16, 1939 |
| 118,157 | Switzerland | Dec. 16, 1926 |